United States Patent [19]

Hashimoto

[11] 4,367,469
[45] Jan. 4, 1983

[54] UNIFORM COLORATION CONTROL IN AN ELECTROCHROMIC DISPLAY OF THE SEGMENTED TYPE

[75] Inventor: Sadakatsu Hashimoto, Nara, Japan

[73] Assignee: Sharp Kabushiki Kaisha, Osaka, Japan

[21] Appl. No.: 166,914

[22] Filed: Jul. 8, 1980

[30] Foreign Application Priority Data

Jul. 11, 1979 [JP] Japan ............... 54-88454

[51] Int. Cl.³ ............................. G09G 3/16
[52] U.S. Cl. ................... 340/785; 340/813; 350/357
[58] Field of Search ............ 340/785, 812, 813, 763; 350/357

[56] References Cited

U.S. PATENT DOCUMENTS

| | | | |
|---|---|---|---|
| 3,921,162 | 11/1975 | Fukai et al. ............... | 340/813 X |
| 4,096,412 | 6/1978 | Sekiya et al. ............. | 340/785 X |
| 4,160,241 | 7/1979 | Shimizu et al. .......... | 340/812 X |
| 4,205,903 | 6/1980 | Inami et al. .............. | 340/785 X |
| 4,219,809 | 8/1980 | Schwarzschild et al. ...... | 340/812 X |
| 4,242,681 | 12/1980 | Tabata ..................... | 340/763 X |
| 4,246,579 | 1/1981 | Wiesner .................... | 340/763 |
| 4,302,751 | 11/1981 | Nakauchi et al. ........... | 340/813 X |

*Primary Examiner*—David L. Trafton
*Attorney, Agent, or Firm*—Birch, Stewart, Kolasch and Birch

[57] ABSTRACT

A drive system is provided for driving an electrochromic display cell including an electrochromic material, a predetermined number of display electrodes, and a counter electrode confronting them, different combination of the display electrodes defining different desired display patterns. The drive system comprises a coloration circuit and a bleaching circuit driven at the same time. The coloration circuit is adapted for conducting coloration operations by applying a coloration voltage to selected ones of the display electrodes. The bleaching circuit is adapted for conducting bleaching operations by applying a bleaching voltage to the remaining display electrodes.

1 Claim, 7 Drawing Figures

UNIFORM COLORATION CONTROL IN AN ELECTROCHROMIC DISPLAY OF THE SEGMENTED TYPE

BACKGROUND OF THE INVENTION

The present invention relates to a driving system for an electrochromic display device which includes an electrochromic material held in electrode carrying support plates to manifest reversible variations in the light absorption properties in response to current applied thereto.

Using memory function of an electrochromic display device, several kinds of driving circuits were proposed so as to maintain the degree of coloration of selected ones of the segmented display electrodes uniform, one of which was disclosed in a copending U.S. patent application Ser. No. 893,513 filed Apr. 4, 1978 by Hiroshi Hamada et al., assigned to the present assignee, now U.S. Pat. No. 4,210,907.

An abstract of U.S. Pat. No. 4,210,970 is as follows

A driving system was provided for an electrochromic display device in which the coloration state is maintained for several hours through several days after the removal of the coloration voltage as long as the electrochromic device is held in an electrically open state. The electrochromic display device included a predetermined number of display segments, each of the combinations of the display segments defining a different one of the desired display patterns. The display segments placed in the coloration state were electrically connected to each other during the memory period in order to uniform the coloration degree of each of the selected display segments. In a preferred form, a detection means was provided for detecting the potential of the selected display segments, which are held in the memory coloration state. The write-in, or, coloration operation was again conducted when the potential of the selected display segments became higher than a preselected level.

However, the conventional driving circuits as disclosed in Ser. No. 893,513 still had defaults as follows: (1) since pulse-like signals were needed to be generated for coloration and bleaching purposes in the driving circuit of Ser. No. 893,513, a driving circuit required for this purpose was limited in which case a simple driving circuit to be used for driving a light emitting diode was not available; (2) a control circuit became complex; and (3) a predetermined degree of coloration of the segmented display electrodes was prevented by leak current inevitably occuring in the coloration stages.

Therefore, it is important and necessary to effectively maintain uniform the degree of coloration of selected ones of the segmented display electrodes by means of a simplified control circuit.

SUMMARY OF THE INVENTION

Accordingly, it is an object of the present invention to provide an improved driving circuit adapted for electrochromic display devices.

It is another object of the present invention to provide an improved driving circuit to maintain uniform the degree of coloration of selected ones of segmented display electrodes by means of a simplified control circuit.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a drive system is provided for driving and electrochromic display cell including an electrochromic material, a predetermined number of display electrodes, and a counter electrode confronting them, different combinations of the display electrodes defining different desired display patterns. The drive system comprises a coloration circuit and a bleaching circuit driven at the same time.

The coloration is adapted for conducting coloration operations by applying a coloration voltage to selected ones of the display electrodes. The bleaching circuit is adapted for conducting belaching operations by applying a bleaching voltage to the remaining display electrodes.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Figure 1:
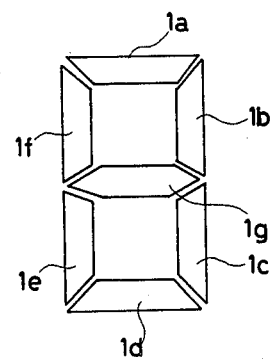
FIG. 1 illustrates the configuration of seven segmented display electrodes adapted for the present invention.

Referring to FIG. 1, there are shown seven segmented display electrodes $1a$, $1b$, $1c$, $1d$, $1e$, $1f$ and $1g$ in a minus-in-square numeric configuration. A counter electrode (not shown here) is provided oppositely disposed with respect to all of the display electrodes. Any of the display electrodes and the counter electrode form in combination a visual display for an electrochromic display. The numeric configuration of the display electrodes should not be limited to the type as pointed out in FIG. 1.

Figure 2:
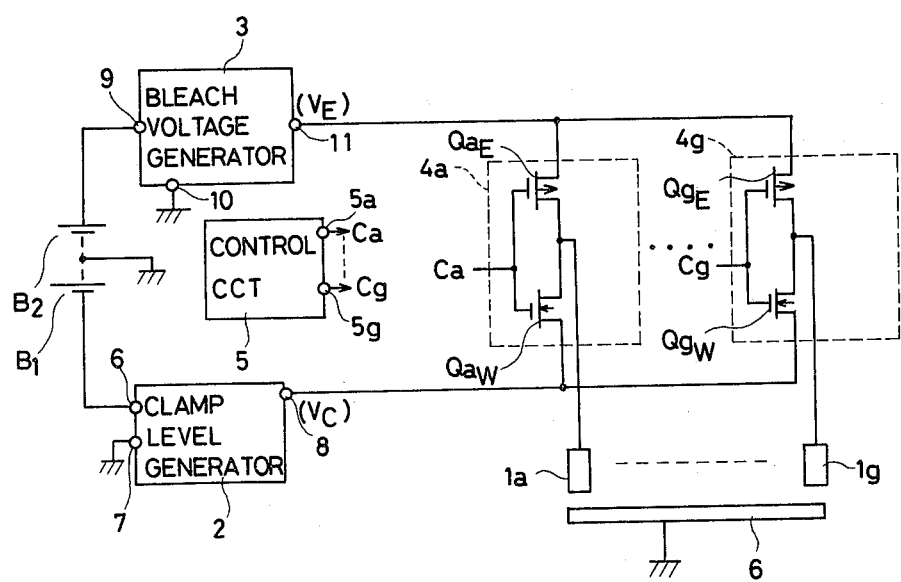
FIG. 2 shows a configuration of a driving circuit according to the present invention.

FIG. 2 shows a circuit diagram of a driving circuit according to the present invention. The driving circuit is operated to illuminate any of the display electrodes in combination with the counter electrode.

The driving circuit comprises a clamp level generator 2, a bleach voltage generator 3, seven switching circuits $4a$ through $4g$, a control circuit 5, the counter electrode 6, batteries B1 and B2, and the seven segmented display electrodes $1a$ through $1g$.

Each of the seven switching circuits 4a through 4g is provided corresponding to each of the seven segmented display electrodes 1a to 1g. The control circuit 5 is provided for controlling the switching circuits 4a through 4g. The counter electrode 6 confronts the display electrodes 1a to 1g as described previously.

Responsive to a negative voltage supplied by the battery B1, the clamp level generator 2 develops a certain voltage marked VC and used for the purpose of the clamp level. The clamp level generator 2 is referred to as a sort of direct current source. One input terminal 6 of the generator 2 is connected of the battery B1. A terminal 7 of the generator 2 is grounded. An output terminal 8 of the generator 2 is coupled to each of the source electrodes provided for the N-channel MOS field effect transistors QaW to QgW which are connected as the seven switching circuits 4a through 4g.

The magnitude of the voltage VC is determined to suffice the following requirement.

It is normal that any of the display electrodes 1a to 1g, when colored, has a smaller voltage than that of the counter electrode 6 by approximately 0.1 to 0.3 volts. On the contrary, when approximate 0.1 to 0.3 volts are applied to any of the display electrodes 1a to 1g, this is colored in a certain degree where no further coloration is accomplished.

Figure 3:
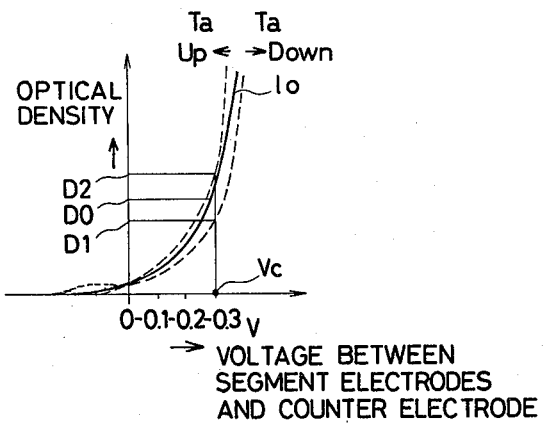
FIG. 3 represents a graph showing properties between optical density of an electrochromic display device and applied voltages to describe the principle for use with the present invention.

FIG. 3 represents a graph showing a relation between optical density and a voltage across any of the display electrodes 1a to 1g and the counter electrode 6. In a qualitative way, there is present an exponential relation therebetween as shown by a real line lo. Therefore, when a desirable optical density is defined according to the relation of FIG. 3, its corresponding voltage is selected as the voltage VC of the clamp level, wherein the degree of coloration of the display electrodes is clamped in the desirable optical density.

Responsive to the positive voltage supplied by the battery B2, the bleach voltage generator 3 provides a bleaching voltage VE used for bleaching any of the display electrodes. The generator 3 is referred to as a kind of direct current source. One input terminal 9 is coupled to the positive pole of the battery B2. A terminal 10 is grounded. An output terminal 11 is connected to each of the source electrodes provided for P-channel MOS field effect transistors QaE to QgE which are connected to the seven switching circuits 4a to 4g.

Each of the seven switching circuits 4a to 4g comprises a couple of C- MOS field effect transistors, say, QaE and QaW, . . . , QgE and QgW. Two drain electrodes of the couple of the transistors QaE and QaW are connected to each other so that they are coupled to the display electrode 1a. In the same manner, two drain electrodes of the couple of the transistors QgE and QgW are tied to each other so that they are led to the display electrode 1g.

Two gate electrodes of the couple of the transistors QaW and QaE are coupled to each other so that they are further connected to an output terminal 5a of the control circuit 5. Two gate electrodes of the couple of the transistors QgE and QgW are tied to each other so that they are further coupled to another output terminal 5g of the control circuit 5.

All other couples of the transistors in connection with the switching circuits 4b to 4f have the same connections.

The control circuit 5 is adapted for controlling the seven switching circuits 4a to 4g in such a manner that all of the display electrodes 1a to 1g are connected to either the clamp level generator 2 for the purpose of receiving the clamp voltage VC or the bleach voltage generator 3 for the purpose of receiving the bleaching voltage VE, according to a visual display by selected ones of the display electrodes 1a to 1g. The control circuits 5 is any decoder circuit as is well known in the art. For example, a conventional BCD-7 segments decoder circuit for driving a numeric display having some light emitting diodes can be adopted for the control circuit 5.

The counter electrode 6 is grounded. The positive pole of the battery B1 and the negative pole of the battey B2 are also grounded.

By virtue of the above circuit arrangement, the driving circuit as shown in FIG. 2 is operated as follows to drive the electrochromic display having the display electrodes as indicated in FIG. 1 and the counter electrode 6.

1. First of all, it is assumed that before a certain time t1 the control circuit 5 has its output terminals 5a to 5g each outputting signals Ca to Cg. The signals Ca to Cf are all in a high level "H." The signal Cg is solely in a low level "L."

In such a case, as the signals Ca to Cf are in the high level "H," all of the MOS transistors QaW to QfW are turned conductive and, simultaneously, all of the MOS transistors QaE to QfE are placed in non-conductive states. All of the display electrodes 1a to 1f are colored due to the application of the clamp voltage VC from the clamp level generator 2. The degree of the coloration of them is clamped in a certain optical density D0 determined by the clamp voltage VC.

As the output signal Cg is in the low level "L," each of the couple of the MOS transistors QgW and QgE is non-conductive and conductive. The bleaching voltage VE is applied to the display electrode 1g from the bleach voltage generator 3 so that the display electrode 1g is kept in a bleached state.

Since the six display electrodes 1a to 1f are all colored and the display electrode 1g is bleached, figure "0" is presently indicated.

Figure 4:
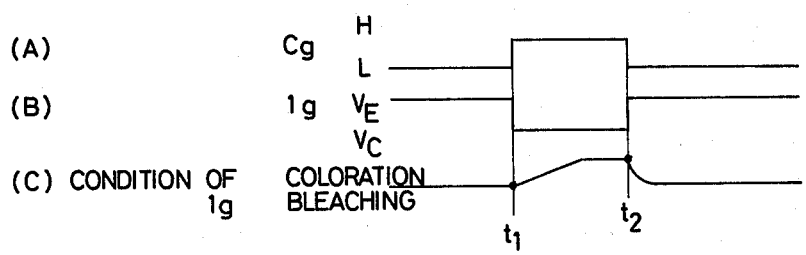
FIG. 4 shows a time chart of signals occuring within the driving circuit of FIG. 2.

2. Under the circumstances as described in paragraph 1, operation as indicated in FIG. 4 is enabled.

As shown in FIG. 4(A), the output signal Cg is solely changed from the low level "L" to the high level "H" at the time t1. Each of the pair of the MOS transistors QgW and QgE becomes conductive and non-conductive. The display electrode 1g is connected to the clamp voltage VC instead of the bleaching voltage VE as represented in FIG. 4(B). The coloration of the display electrode 1g commences gradually as indicated in FIG. 4(C) until it is lastly colored in the level of the optical density D0 in common with the other display electrodes 1a to 1f. No further coloration of the display electrode 1g is accomplished.

All of the display electrodes 1a to 1g are colored having the same degree of the coloration in which case figure "8" is pointed out.

3. Subsequently, the operation as referred to in the paragraph 1 is repeated in a time t2. The output signal Cg is changed from the high level "H" to the low level "L," as shown in FIG. 4(A), so that each of the pair of the MOS transistors QgW and QgE becomes non-conductive and conductive. The display electrode 1g is connected again to the bleaching voltage VE as shown in FIG. 4(B). As viewed in FIG. 4(C), it is gradually bleached so that figure "0" is indicated.

4. For the purpose of indicating another type of figure in place of "0" and "8" by the electrochromic display, the control circuit 5 is operated for enabling selected output signals to develop so that selected display electrodes have the output signals of the high level "H" and the low level "L."

The present invention provides the following advantageous features as compared with the conventional driving techniques, as disclosed in Ser. No. 893,513 filed Apr. 4, 1978, using the memory function present in the electrochromic display.

By the conventional driving techniques, it was difficult to entirely prevent a small amount of leak current through the driving circuit. For example, a specific type of display electrode is assumed to have an area of 0.05 $cm^2$ and to provide a normal coloration by the application of a charge of 8 $mc/cm^2$. When a leak current in an amount of 0.1 μA is supposed to be present in a direction for bleaching purposes, ten percent of the amount of the charge in the display electrode is reduced within about 7 minutes so that the degree of the coloration of it is accordingly down. The smaller the display electrode is the greater the degree of the coloration of it is reduced.

On the contrary, according to the present invention, all of the display electrodes selected from the ones 1a to 1g, when presently colored, are continuously clamped in the clamp voltage VC so that any bleaching by the leak current is completely prohibited.

By the driving circuit as indicated in FIG. 2, since the clamp voltage VC is small, say, about −0.1 to about −0.3 volts, several seconds to ten and several seconds are required so that the display electrode can provide sufficient coloration in response to the application of the clamp voltage VC.

Figures 5, 6:
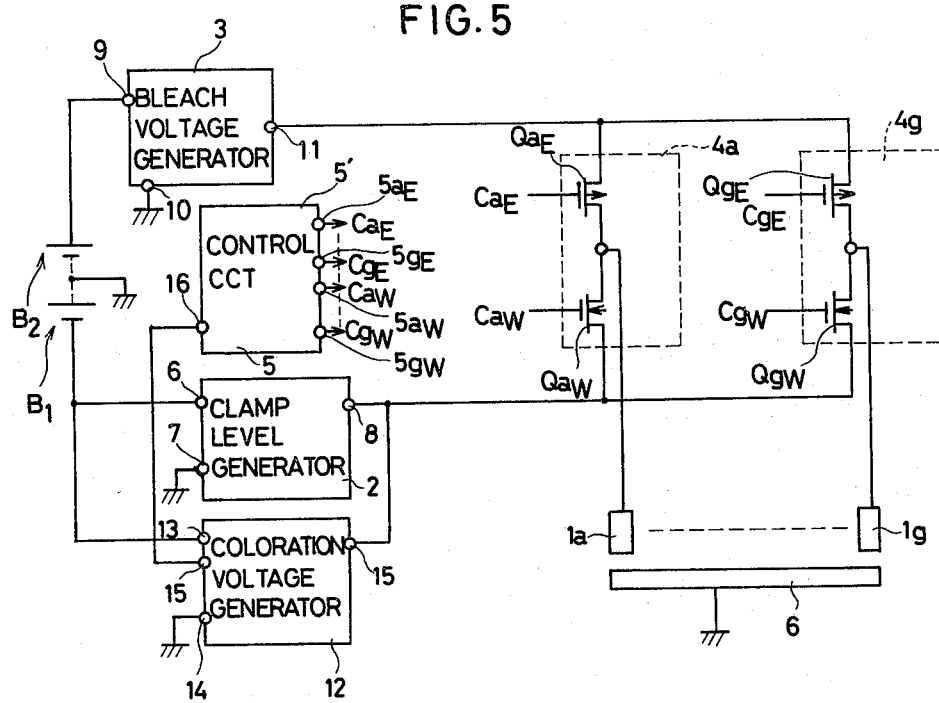
FIG. 5 shows a configuration of another driving circuit of the present invention.
FIG. 6 shows a time chart of signals occurring within the driving circuit of FIG. 5.

Another specific form of the driving circuit of the present invention is shown in FIG. 5 wherein the display electrode can provide sufficient coloration in response to the application of the clamp voltage VC during approximate several hundred msec.

The circuit arrangement of the driving circuit shown in FIG. 5 is identical to that of FIG. 2 with the exception that in place of the control circuit 5 used in FIG. 2 for developing its output signals Ca to Cg in which case the coloration operation is enabled by the high level "H" and the bleaching operation is enabled by the low level "L," an improved control circuit 5' is used for generating its coloration signals CaW to CgW and its bleaching signals CaE to CgE.

Additionally, a coloration voltage generator 12 is provided for generating a coloration voltage VE having approximate −1.5 Volts in response to control signals from the control circuit 5'. An object of the driving circuit of FIG. 5 is to apply a coloration voltage having a larger value than the clamp voltage VC to newly colored display electrodes during a short time, and subsequently to apply the clamp voltage VC thereto in an attempt to improve the response time.

The control circuit 5' provides the coloration signals CaW to CgW through its output terminals 5aW to 5gW. Each of the output terminals 5aW to 5gW are connected to each of the gate electrodes of the MOS field effect transistors QaW to QgW. The bleaching signals CaE to CgE are developed from other terminals 5aE to 5gE of the control circuit 5'. Each of the output terminals 5aE to 5gE is coupled to each of the gate electrodes of the MOS field effect transistors CaE to CgE.

The coloration voltage generator 12 comprises, a mono-stable multivibrator. A source terminal 13 is tied to the negative pole of the battery B1. An output terminal 15 is coupled to the output terminal 8 of the clamp level generator 2. A terminal 14 is grounded. An input terminal 15 of the coloration voltage generator 12 is connected to an output terminal 16 of the control circuit 5' with the object to receive coloration instruction signals from the control circuit 5'.

The driving circuit of FIG. 5 is operated as follows to drive the electrochromic display having the counter electrode 6 and the display electrodes as indicated in FIG. 1. For the sake of description, only the display electrodes 1a to 1g are explained while other electrodes 1b to 1f are neglected, although they can be operated in the same way if necessary.

1. It is assumed that before a certain time t10 the following situation is present.

The electrochromic display indicates figure "6" in a visual form. As shown in FIG. 6(A) to (D), the control circuit 5' develops the signals CaE and CaW both in the low level "L," and the signals CgE and CgW both in the high level "H." The bleaching voltage VE is applied to the display electrode 1a so that it is bleached as shown in FIG. 6(E) and (G). The clamp voltage VC from the clamp level generator 2 is applied to the display electrode 1g so that it is colored as indicated in FIG. 6(F) and (H).

2. Under the circumstances as referred to in paragraph 1, the operation at the time t10 as shown in FIG. 6(A), (B) and (D) is conducted. In such a case the control circuit 5' develops the output signals CaE and CaW both in the high level "H," and the output signals CgW in the low level "L." Each of the pair of the MOS transistors QaW and QaW becomes non-conductive and conductive. The display electrode 1a is coupled to the output terminal 8 of the clamp level generator 2 and the output terminal 15 of the coloration voltage generator 12.

At the time t10 the control circuit 5' develops its coloration instruction signals entering the coloration voltage generator 12. The coloration voltage generator 12 develops the coloration voltage VE from its output terminal 15.

Therefore, the coloration voltage VE is introduced into the display electrode 1a so that rapid coloration of the display electrode 1a is enabled as shown in FIG. 6(E) and (G).

Since the output signals CgW are in the low level "L" and the output signals CgE are in the high level "H," both of the transistors QgW and QgE are placed in non-conductive states. As shown by waved line between t10 and t12 in FIG. 6(F), the display electrode 1g is placed in a condition of high impedance so that it is not influenced by the coloration voltage VE to thereby maintain its colored condition.

3. At a time t11 between t10 and t12, the degree of the coloration of the display electrode 1a may tend to reduce from a normal condition. In such a case, the clamp voltage VC is introduced into the display electrode 1g and, simultaneously, the output signals CgW is again in the high level "H" to make the MOS transistor QgW conductive. Therefore, the display electrode 1g is again clamped by the clamp voltage VC. Just after the time t11, the display electrode 1a reaches its normal colored state in which case the electrochromic display shows a figure "8."

4. At a time t12, as shown in FIG. 6(C) and (D), both of the output signals CgE and QgW are in the low level "L." Each of the MOS transistors QgE and QgW becomes conductive and non-conductive. The display electrode 1g has the bleaching voltage VE to thereby be bleached as shown in FIG. 6(F) and (H).

The electrochromic display indicates figure "7" because of the failure of the indication by the display electrode 1g.

5. At a time t13, as indicated in FIG. 6(A) and (B), both of the output signals CaE and CaW are in the low level "L." Each of the MOS transistors QaE and QaW is made conductive and non-conductive. The bleaching voltage VE is applied to the display electrode 1a to bleach it as represented in FIG. (E) and (G).

The electrochromic display shows, for example, figure "1" because of the failure of the indication by the two display electrodes 1a and 1g.

As stated above, selected ones of display electrodes are indicated to show a specific numerical symbol. One or more newly display electrodes reach rapidly predetermined coloration by the techniques as referred to in the paragraph 2.

When the clamp voltage VC is fixed in a certain value, the degree of the coloration of display electrodes is affected by temperature. An increase in temperature Ta causes the optical density to change from D1 to D2 as shown in FIG. 3 wherein any of the display electrodes 1a to 1g is colored deeply in a high temperature and colored in a light condition in a low temperature.

Figure 7:
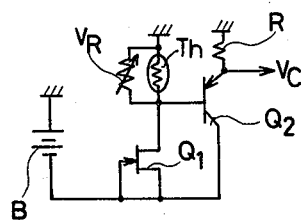
FIG. 7 shows a configuration of a clamp level generator with temperature compensating capability.

In order to compensate for this disorder, an improved clamp level generator is shown in FIG. 7. It includes a temperature compensating function. By the clamp level generator of FIG. 7, the clamp voltage VC is varied according to temperature so that the degree of the coloration of the display electrodes becomes uniform.

The clamp level generator of FIG. 7 comprises a variable register VR, two transistors Q1 and Q2, a thermistor Th, and a battery B. The transistor Q1 is a junction-type field effect transistor. The drain electrode and the gate electrode of the transistor Q1, and the collector electrode of the transistor Q2 are coupled to the negative pole of the battery B. The positive pole of the battery B is grounded.

Both of the variable resistor VR and the thermistor Th, coupled in parallel, are connected between the source electrode of the transistors Q1 and the ground. The base electrode of the transistor Q2 is tied to the source electrode of the transistor Q1. The emitter electrode of the transistor Q2 is grounded through a resistor R.

By the circuit arrangement of the clamp level generator, temperature compensating operation is as follows. A temperature Ta is assumed to be changed from about 25° centigrade to about 40° centigrade. A current through the drain electrode of the transistor Q1 is reduced by about 5%. A resistor value of the thermistor Th is down. A voltage in the base electrode of the transistor Q2 is changed toward the earth level.

Therefore, the clamp voltage VC (a voltage in the emitter electrode of the transistor Q2) is down according to a decrement in the voltage in the base electrode of the transistor Q2.

When the temperature Ta is down, on the contrary, the clamp voltage VC becomes larger.

A voltage across the base electrode and the emitter electrode of the transistor Q2 is slightly down and up according to the increase and the decrease in temperature, respectively. The variation in the voltage can be canceled by virtue of function by the transistor Q1 and the thermistor Th so that it is approximately in harmony with the variation in properties of the electrochromic display.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In a drive system for driving an electrochromic display cell including an electrochromic material and a predetermined number of display electrodes, different combinations of said display electrodes defining different desired display patterns, said drive system comprising:

coloration means connected to said display electrodes for conducting coloration operations on selected ones of said display electrodes by applying a coloration voltage to the selected display electrodes:

bleaching means connected to said display electrodes for bleaching selected ones of said display electrodes by applying a bleaching voltage thereto: and clamping means connected to said display electrodes for clamping said selected display electrodes in a stable colored condition following the coloration thereof by said coloration means by applying a direct current clamping voltage thereto, the magnitude of which is smaller than that of said coloration voltage;

said clamping means comprising compensating means for changing the magnitude of the clamping voltage supplied by the clamping means according to variations in temperature to maintain said selected ones of said display electrodes clamped in said stable colored condition regardless of the variation in temperature.

* * * * *